(12) United States Patent
Boer et al.

(10) Patent No.: US 8,246,915 B2
(45) Date of Patent: Aug. 21, 2012

(54) HEAT-EXCHANGER FOR CARRYING OUT AN EXOTHERMIC REACTION

(75) Inventors: Anne Boer, Amsterdam (NL); Franciscus Johannes Maria Schrauwen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1378 days.

(21) Appl. No.: 10/587,433

(22) PCT Filed: Jan. 27, 2005

(86) PCT No.: PCT/EP2005/050340
§ 371 (c)(1),
(2), (4) Date: Jul. 26, 2006

(87) PCT Pub. No.: WO2005/075065
PCT Pub. Date: Aug. 18, 2005

(65) Prior Publication Data
US 2007/0053807 A1    Mar. 8, 2007

(30) Foreign Application Priority Data
Jan. 28, 2004 (EP) .................................. 04250471

(51) Int. Cl.
*B01J 19/00* (2006.01)
*F28D 7/00* (2006.01)
*F28F 1/10* (2006.01)
*F28F 9/02* (2006.01)

(52) U.S. Cl. ........ 422/198; 422/129; 422/200; 422/201; 165/172; 165/173; 165/174; 165/175; 165/176; 165/177

(58) Field of Classification Search ............... 422/198
See application file for complete search history.

(56) References Cited

U.S. PATENT DOCUMENTS

| 672,094 A | 4/1901 | Cliffton |
| 2,526,651 A | 10/1950 | Garbo ........................ 260/449.6 |
| 2,883,169 A | 4/1959 | Daman ........................... 261/77 |
| 3,656,543 A | 4/1972 | Wolowodiuk et al. .......... 165/74 |
| 3,802,497 A * | 4/1974 | Kummel et al. .............. 165/158 |

(Continued)

FOREIGN PATENT DOCUMENTS

DE    3245318    6/1984

(Continued)

OTHER PUBLICATIONS

Wang Dingzu, "Development Status of Catalytic Process and Catalyst Production of Hydrocarbon From Syngas, Coal Conversion," vol. 16, No. 3, Aug. 1993.

*Primary Examiner* — Walter D Griffin
*Assistant Examiner* — Natasha Young

(57) ABSTRACT

Disclosed is a removable cooling module (1), for use in a reactor (20) for carrying out an exothermic reaction, comprising a coolant feed tube (2); a distribution chamber (4); a plurality of circulation tubes (5); and a collection chamber (6); said coolant feed tube (2) having at its first end an inlet (3), for charging the coolant module (1) with coolant, and communicating with said distribution chamber (4) at its second end; each of said circulation tubes (5) communicating with the distribution chamber (4) through a first end and communicating with said collection chamber (6) through a second end; the collection chamber (6) having an outlet for discharging coolant. The modular nature of the invention facilitates removal of individual cooling module (1) from a reactor shell (21).

2 Claims, 4 Drawing Sheets

U.S. PATENT DOCUMENTS

| | | | |
|---|---|---|---|
| 3,870,099 A | 3/1975 | Wolowodiuk | 165/82 |
| 4,060,127 A | 11/1977 | Savin et al. | 165/145 |
| 286,735 A | 10/1983 | Rössler | |
| 4,632,587 A | 12/1986 | Vollharadt | 422/202 |
| 4,801,424 A | 1/1989 | Schweiger | 376/283 |
| 4,960,546 A | 10/1990 | Tharp | 261/122 |
| 4,965,051 A | 10/1990 | Shukunobe et al. | 422/145 |
| 5,062,458 A | 11/1991 | Rohleder et al. | 141/70 |
| 5,324,335 A | 6/1994 | Benham et al. | 44/452 |
| 5,527,473 A | 6/1996 | Ackerman | 210/767 |
| 5,925,293 A | 7/1999 | Howk | 261/93 |
| 6,333,019 B1 | 12/2001 | Coppens | 423/659 |
| 6,344,490 B1 | 2/2002 | DeGeorge et al. | 518/700 |
| 6,423,218 B1 | 7/2002 | Lindermeir et al. | 210/170 |
| 6,797,039 B2 | 9/2004 | Spencer | 95/153 |
| 2003/0001295 A1 | 1/2003 | Okajima et al. | 261/124 |
| 2003/0057132 A1 | 3/2003 | Wittenbrink et al. | 208/24 |
| 2003/0080446 A1 | 5/2003 | Cheng | 261/77 |
| 2003/0087970 A1 | 5/2003 | Wittenbrink et al. | 518/728 |
| 2004/0123738 A1 | 7/2004 | Spencer | 95/236 |

FOREIGN PATENT DOCUMENTS

| | | |
|---|---|---|
| EP | 0592176 | 4/1994 |
| EP | 0609079 | 8/1994 |
| EP | 0956126 | 5/2002 |
| GB | 281224 | 10/1928 |
| GB | 787123 | 12/1957 |
| RU | 2206384 C1 | 2/2002 |
| WO | WO9416807 | 8/1994 |
| WO | 96/26003 | 8/1996 |
| WO | 98/37168 | 8/1998 |
| WO | 00/66257 | 11/2000 |
| WO | 02/22249 | 3/2002 |

* cited by examiner

HEAT-EXCHANGER FOR CARRYING OUT AN EXOTHERMIC REACTION

PRIORITY CLAIM

The present application claims priority on European Patent Application 04250471.2 filed 28 Jan. 2004.

FIELD OF THE INVENTION

The present invention relates to a cooling module and a reactor for carrying out an exothermic reaction comprising such a cooling module. In particular, the invention relates to a cooling module and reactor suitable for use in Fischer-Tropsch reactions, as well as to hydrocarbons and fuels derived from these hydrocarbons which can be made by the hydrogenation of carbon monoxide in a process using the reactor and the cooling modules.

BACKGROUND OF THE INVENTION

The Fischer-Tropsch process is often used for the conversion of hydrocarbonaceous feed stocks into liquid and/or solid hydrocarbons. The feed stock (e.g. natural gas, associated gas, coal-bed methane, residual (crude) oil fractions and/or coal) is converted in a first step into a mixture of hydrogen and carbon monoxide (this mixture is often referred to as synthesis gas). The synthesis gas is then converted in a second step over a suitable catalyst at elevated temperature and pressure into paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidised bed reactors, such as entrained fluidised bed reactors and fixed fluidised bed reactors, and slurry bed reactors such as three-phase slurry bubble columns and ebulated ebullated bed reactors. A suitable Fischer-Tropsch reactor has been described in U.S. Pat. No. 5,517,473. However, the reactor described in this reference describes a large, completely fixed cooling system, which makes manufacturing, transport and repair (e.g. in the case of a leakage) difficult.

The Fischer-Tropsch reaction is very exothermic and temperature sensitive with the result that careful temperature control is required to maintain optimum operation conditions and desired hydrocarbon product selectivity. Bearing in mind the very high heat of reaction which characterises the Fischer-Tropsch reaction the heat transfer characteristics and cooling mechanisms of a reactor are very important.

The heat transfer performance of fixed-bed reactors is limited because of the relatively low mass velocity, small particle size and low thermal capacity of fluids. If one attempts, however, to improve the heat transfer by increasing the gas velocity, a higher CO conversion can be obtained, but there is an excessive pressure drop across the reactor, which limits commercial viability. Increasing reactor capacity by increasing gas throughput and CO conversation may result in increasing radial temperature gradients. For thermal stability and efficient heat removal the Fischer-Tropsch fixed-bed reactor tubes should have a diameter of less than 5 or 7 cm. The desired use of high-activity catalysts in Fischer-Tropsch fixed-bed reactors makes the situation even worse. The poor heat transfer characteristics make local runaways (hotspots) possible, which may result in local deactivation of the catalyst. In order to avoid runaway reaction the maximum temperature within the reactor must be limited. However, the presence of temperature gradients within the reaction mixture means that much of the catalyst is operating at sub-optimal levels.

The use of liquid recycle as a means of improving the overall performance in a fixed-bed design has been described. Such a system is also called a "trickle bed" reactor (as part of a sub set of fixed-bed reactor systems) in which both reactant gas and liquid are introduced (preferably in a down flow orientation with respect to the catalyst) simultaneously. The presence of the flowing reactant gas and liquid improves heat removal and heat control thus enhancing the reactor performance with respect to CO conversion and product selectivity. A limitation of the trickle bed system (as well as of any fixed-bed design) is the pressure drop associated with operating at high mass velocities. The gas-filled voidage in fixed-beds (typically less than 0.50) and size and shape of the catalyst particles does not permit high mass velocities without excessive pressure drops. Consequently, the mass throughput undergoing conversion per unit reactor volume is limited due to the heat transfer rates. Increasing catalyst particle size and higher mass flow rates improve heat transfer (for a given pressure drop) and enable increased conversion capacity. However, the loss of catalyst selectivity and lower catalyst efficiency may offset the improved conversion capacity.

Three-phase slurry bubble column reactors generally offer advantages over the fixed-bed design in terms of heat transfer characteristics. Such reactors typically incorporate small catalyst particles suspended by upward flowing gas in a liquid continuous matrix. A plurality of cooling tubes are present in three phase slurry system. The motion of the continuous liquid matrix allows sufficient heat transfer to achieve a high commercial productivity. The catalyst particles are moving within a liquid continuous phase, resulting in, efficient transfer of heat generated from catalyst particles to the cooling surfaces, while the large liquid inventory in the reactor provides a high thermal inertia, which helps prevent rapid temperature increases that can lead to thermal runaway. An extensive description of three phase slurry bubble column reactors is given in W.-D. Deckwer, Bubble Column Reactors (John Wiley & Sons, Chichester, 1991).

Commercial fixed-bed and three-phase slurry reactors typically utilise boiling water to remove the heat of reaction. In the fixed-bed design, individual reactor tubes are located within a shell containing water/steam typically fed via flanges in the shell wall. The heat of reaction raises the temperature of the catalyst bed within each tube. This thermal energy is transferred to the tube wall forcing the water in the surrounding jacket to boil. In the slurry design, cooling tubes are placed within the slurry volume and heat is transferred from the liquid continuous matrix to the tube walls. The production of steam within the tubes provides the needed cooling. The steam in turn is used for heating purposes or to drive a steam turbine.

Synthesis gas leaking into the cooling system (identifiable through analysis of the steam output) cannot be separated, represents a risk and will force shutdown and repair of the slurry reactor. In light of the exothermic nature of the reaction and the typical volume of slurry reactors the shutdown process is both time consuming and expensive in terms of loss of production capacity. Where a known reactor utilises a single header with multiple interconnected tubes the identification and repair of a leaking tube is difficult. In light of these difficulties it is known to block off a leaking tube rather than to attempt repair. However, blocking off a relatively large number of leaking tubes has the disadvantage of reducing cooling capacity resulting in a part of the reactor being uncooled, or under cooled, with the possible formation of hotspots. In addition, the cooling capacity of the reactor decreases, resulting in a reactor which is loosing its intrinsical safety.

Another drawback of known slurry reactors is that the cooling tubes are fixed in place inside the reactor during construction. Typically the cooling tubes are welded to headers through which the tubes are fed with coolant. Such an arrangement involves dangers for personnel during inspection and repair of individual cooling tubes when the reactor is configurated for use. Furthermore, given their large size, commercial reactors generally have to be transported in a horizontal position. This leads to difficulties in ensuring that tubes within the reactors are not damaged or dislodged.

SUMMARY OF THE INVENTION

The present invention provides a cooling module for use in an exothermic reaction reactor which is simple and efficient to construct, transport and operate, and which addresses some of the disadvantages described above in relation to cooling systems employed in known reactors.

The invention also provides a cooling module that simplifies the identification and repair of leaks.

In a preferred embodiment, the invention provides a reactor for carrying out an exothermic reaction having a cooling system which addresses the disadvantages described above in relation to known reactors.

Accordingly the present invention provides a removable cooling module having first and second ends, for use in a reactor for carrying out an exothermic reaction, the cooling module comprising:
  a coolant feed tube;
  a distribution chamber;
  a plurality of circulation tubes; and
  a collection chamber;
  said coolant feed tube having at its first end an inlet, for charging the cooling module with coolant, and communicating with said distribution chamber at its second end;
  each of said circulation tubes communicating with the distribution chamber through a first end and communicating with said collection chamber through a second end;
  the collection chamber having an outlet for discharging coolant;
  wherein the inlet and the outlet are both located towards the same end of the cooling module, wherein the inlet is adapted to be removably connectable to a charge pipe and the outlet is adapted to be removably connectable to a discharge pipe.

BRIEF DESCRIPTION OF THE DRAWINGS

Without wishing to be restricted to a particular embodiment, the invention will now be described in further detail with reference to the drawings in which.

DETAILED DESCRIPTION OF THE INVENTION

Figure 1:
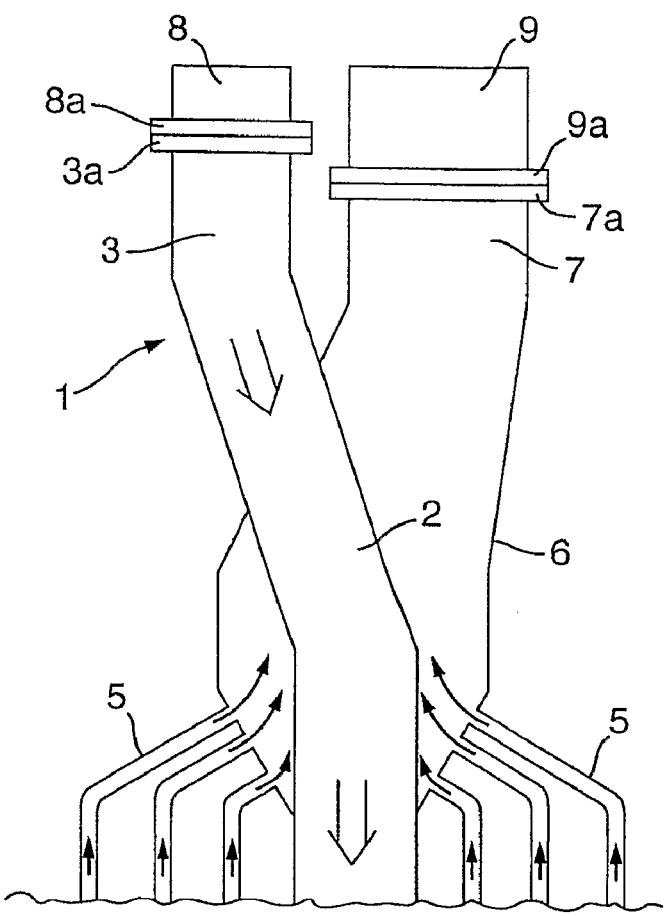
FIG. 1 depicts a vertical cross-section through a cooling module according to the invention.
Figure 1:
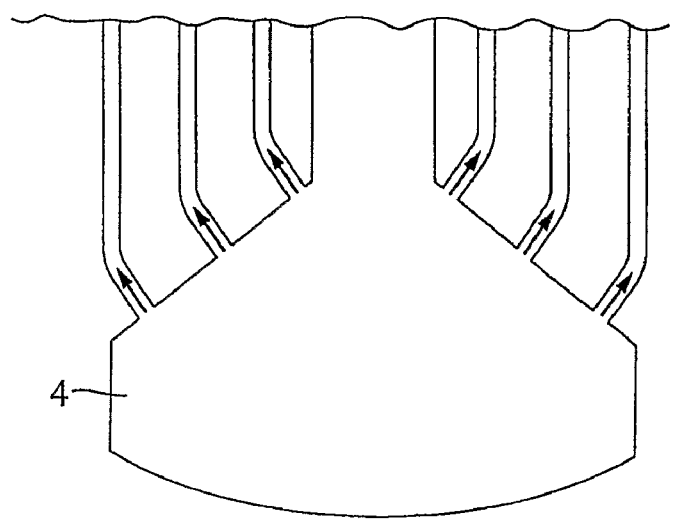

The present invention provides a removable cooling module having first and second ends for use in a reactor for carrying out an exothermic reaction.

The removably connectable means to be used comprise means known in the art, see for instance Perry's Chemical Engineers' Handbook, 6$^{th}$ Edition, Chapter 6, 6-41/6-57. Suitable means are flanges, threaded joints (using single or double threaded connection joints), clamped joints, seal ring joints, pressure seal joints, compression fitting joints etc. Clamped joints are preferred, especially C-clamped joints.

Preferably the distribution chamber comprises a conical or spherical section, preferably a conical section defining apertures through which the distribution chamber communicates with each of the circulation tubes.

Preferably the collection chamber comprises a conical or spherical section, preferably a conical section defining apertures through which the collection chamber communicates with each of the circulation tubes.

Preferably the distribution chamber and the collection chamber do not contain any flat parts. In view of the pressure difference, for instance when used as cooling modules in a chemical reactor including start-up, cooling-down and any emergency shut down, between the inside of the module and the outside of the module, any flat parts need to be manufactured from stronger and/or thicker material than the other parts of the module, which make manufacturing more complicated/expensive than in the situation that only spherical and/or conical chambers are used.

In a preferred embodiment the coolant feed tube is located substantially centrally with respect to the distribution tubes and may optionally protrude through the collection chamber. In a special case the coolant feed tube may be located in the collection chamber, in which case the charge pipe may be situated at least partly inside the discharge pipe. In such a situation less passages through the reactor wall are necessary.

The cooling module may comprise any number of circulation tubes required to provide sufficient cooling that is preferably between about 20 and about 4,000 circulation tubes and more preferably between about 100 and about 400. The cooling modules may have any cross section which provides for efficient packing of cooling modules within e.g. a reactor, for example, square rectangular or hexagonal cross section. A square is preferred. A round cross section is not preferred as two or more modules cannot completely fill a cylindrical reactor.

In general, the cooling module will have an elongated shape. The inlet of the coolant feed tube will commonly be located at the first end of the cooling module. The distribution chamber is normally situated at the second end of the cooling module. Thus, the coolant feeding tube in general will extend from the first end of the cooling tube to the second end of the cooling tube. The collection chamber is generally situated at the first end of the cooling module. The circulation tubes and the coolant feed tube are generally forming the connection between the first end and the second end of the cooling module, and as such will form the elongated part of the cooling module. In use, the cooling module will usually be in a vertical position, the first end at the higher part of the cooling module, the second end forming the lower part of the module. It will be appreciated that the cooling module as defined above is not surrounded by a reactor shell.

According to another aspect, the invention provides a reactor for carrying out an exothermic reaction, said reactor comprising:
  a reactor shell;
  means for introducing reactants into the reactor shell;
  means for removing products from the reactor shell; and
  cooling means;
wherein said cooling means comprises at least one removable cooling module having first and second ends, for use in a reactor for carrying out an exothermic reaction, the cooling module comprising a coolant feed tube; a distribution chamber; a plurality of circulation tubes; and a collection chamber; said coolant feed tube having at its first end an inlet, for charging the coolant module with coolant, and communicating with said distribution chamber at its second end; each of said circulation tubes communicating with the distribution chamber through a first end and communicating with said collection chamber through a second end; the collection chamber having an outlet for discharging coolant; wherein the inlet and the outlet are both located towards the same end of the cooling module.

Preferably the inlet is adapted to be removably connectable to a charge pipe and the outlet is adapted to be removably connectable to a discharge pipe, or the upper parts of the inlet and/or outlet may form the charge and/or discharge pipe. The inlet and outlet may also be connected by a fixed joint, for example a welded joint. In the above situation the connection or the joint may be opened for instance by an oxy-acetylene cutter. Preferred removably connectable joints are discussed hereinbefore.

Preferably the reactor shell comprises access means, such as a manhole, for accessing the cooling means. More preferably the manhole is at the top of the reactor, close to or at the centre of top of the reactor. Thus, it is possible to lift one or even more of the cooling modules out of the reactor.

Preferably the reactor comprises support means for supporting the cooling means.

Typically the means for introducing reactants, especially gaseous reactants, into the reactor shell are located at the bottom end of the reactor, although minor amounts may also be introduced at a higher level. Suitably the means for introducing (gaseous) reactants may comprise one or more spargers for introducing gas, especially syngas.

Typically the means for removing products from the reactor shell may comprise a filter.

Preferably the reactor further comprises one or more screens or baffles adapted to modify the circulation of reactants and products within the reactor shell.

For each cooling module, in use, the inlet is typically removably connected to a charge pipe and each outlet is typically removably connected to a discharge pipe.

Preferably the connection between the inlet and the charge pipe is achieved by means of an inlet flange and a charge pipe flange secured with a 'c-clamp' or other suitable fixing means. Similarly, the connection between the outlet and the discharge pipe is preferably achieved by means of an outlet flange and a discharge pipe flange secured with a 'c-clamp' or other suitable fixing means.

The modular nature of the cooling system has the advantage that individual cooling modules may be removed from the reactor shell, for example for inspection, replacement, maintenance or repair purposes. Furthermore, the reactor shell and cooling modules may be manufactured and transported separately. Additional advantages of the cooling module and the reactor of the present invention will be apparent from the detailed description below.

The charge pipe and the discharge pipe are conveyed through the reactor wall. This may be done at any part of the reactor wall, but is preferably done at the top part of the reactor, e.g. through the reactor dome, but is preferably done through the cylindrical part of the reactor. In that way less problems will arise due to strain in the reactor walls. Preferably all passages of the charge pipes and all passages of the discharge pipes are at about the some level of the reactor (see e.g. FIG. 2), which gives the possibility to strengthen the reactor wall at that place, e.g. by a thicker reactor wall, or by an extra cylindrical ring which is fixed (e.g. welded) to the reactor. Such a ring suitably has a height up to three meter, preferably up to one meter. The inlet/outlet passage are preferably situated between the top of the cylindrical part of the reactor and the middle of the cylinder, more preferably in the top third of the cylinder at least 1 m below the transition of the cylinder into the dome. The charge pipe and the discharge pipe are preferably removably connected with the cooling modules, preferably above the cooling modules. Further, they preferably comprise a second removable connection, suitably close to the reactor wall. This makes it possible to remove fairly easily all piping above the cooling modules, thus creating space above the cooling modules for inspection and maintenance, and making it possible to remove one or more cooling modules. In a preferred embodiment (see e.g. FIG. 2) the charge and discharge pipe, when conveyed through the cylindrical part of the reactor have a direction perpendicular to the reactor wall. In the case that any openings remain between the cooling modules and/or the reactor walls, these open spaces can be used for instance for draft tubes, catalyst regeneration tubes, filters etc. In order to prevent channels of low resistance for upflowing gas streams, also closed tubes may place in the openings or one or more horizontal plates or screens may be installed in the open places to increase the resistance.

According to a further aspect, the invention provides a method for carrying out an exothermic reaction comprising the steps of:

charging a reactor with reactants;
cooling the contents of the reactor; and
removing products from the reactor, wherein the cooling step is carried out using cooling means comprising at least one cooling module as described above.

Turning now to FIG. 1 a first embodiment of a cooling module 1 according to the invention comprises a coolant feed tube 2, for introducing a coolant into the module, having an inlet 3 at its first end and being in fluid communication with a distribution chamber 4 located at its second end. The distribution chamber 4 is in turn in fluid communication with one or more circulation tubes 5 through a first end of each of said tubes 5, with the second end of each circulation tube 5 communicating with a collection chamber 6. The collection chamber 6 has an outlet 7 for discharging the coolant. The direction of flow of coolant within the cooling module 1 is indicated with arrows. The configuration of the cooling module 1 is such that the inlet 3 and outlet 7 are located adjacent to each other towards the same end of the cooling module.

In operation the inlet 3 is removably connected to a charge pipe 8 and the outlet 7 is removably connected to a discharge pipe 9. Preferably, removable connection of the charge pipe 8 to the inlet 3 may be provided by means of charge pipe flange 8a and inlet flange 3a which may be removably sealed using a 'C'-clamp (not shown) or suitable means. Similarly, removable connection of the discharge pipe 9 to the outlet 7 may be provided by means of discharge pipe flange 9a and outlet flange 7a which may be removably sealed using a 'C'-clamp (not shown) or the like.

In principle removable connection may be achieved by welding together the components in question, wherein they may be disconnected by suitable cutting means. Preferably the removable connection comprise flanges, threaded joints, clamped joints etc. as discussed above, and not any connections which need to be opened by suitable cutting means as oxy-acetylene cutters.

Coolant is introduced through charge pipe 6 into the cooling module 1 via inlet 3 and flows through coolant feed tube 2 to the distribution chamber 4. The coolant is then distributed through circulation tubes 5 to collection chamber 6 where it is collected and discharged via outlet 7 and discharge pipe 7. Heat is transferred from the slurry surrounding the cooling module 1 to the coolant as it passes through the module and in particular as the coolant flows through the circulation tubes 5 and, to a lesser extent, the coolant feed tube 2.

Preferably the cooling module 1 is configured such that the inlet 3 and outlet 7 are located relatively close to each other, thus providing ease of access.

Suitable coolants will be known to the person skilled in the art and include for example water/steam or oil based coolants.

Any configuration of coolant feed tube 2, distribution chamber 4, circulation tubes 5 and collection chamber 6 which provides effective cooling may be employed. Preferably the coolant feed tube 2 is located substantially centrally with respect to the circulation tubes 5 as shown in FIG. 1. Such a configuration enhances mechanical stability of the cooling module 1 and facilitates distribution and collection of the coolant. In the embodiment shown in FIG. 1 the coolant feed tube 2 protrudes through the collection chamber 4. The distribution chamber 4 and collection chamber 6 may be of any shape which facilitates efficient distribution and collection of coolant within the module 1. For example, the distribution chamber 4 and the collection chamber 6 may be spherical or curved (hemispherical) in nature. It is preferable to avoid flat surfaces, particularly in relation to the distribution chamber 4, where catalyst particles in the slurry surrounding the cooling module may accumulate. It is envisaged that the circulation tubes 5 may be connected directly to the lower end of the coolant feed tube 2, in which case the lower end (that is to say the end furthest from the inlet 3) of the coolant feed tube 2 represents a distribution chamber. It is preferred that the distribution chamber 4 and the collection chamber 6 each comprise a conical section through which each of said chambers 4, 6 communicate with respective ends of the circulation tubes 5. Preferably the distribution chamber 4 and the collection chamber 6 each comprise a conical section the curved surface of which defines an angle of between 0 and about 45° to the vertical. Clearly, in the case where this angle is 0° the circulation tubes 5 are connected directly to the lower end (that is to say the end furthest from the inlet 3) of the coolant feed tube 2.

The cooling module characteristically comprises a plurality of elongated circulation tubes 5 which facilitate circulation of coolant within the module 1. The circulation tubes 5 are preferably substantially parallel to and equidistant from each other.

The number and size of circulation tubes 5 in the cooling module 1 is limited only by the cooling requirements of particular circumstances and physical constraints of manufacture. Typically a cooling module will comprise between about 10 and about 4,000 circulation tubes, preferably between about 100 and about 400. Depending on the volume and capacity of the reactor, each cooling tube may be about 4 to about 40 m in length. Preferably the cooling tubes (5) are from about 10 to about 25 m in length. The circulation tubes usually comprise a bundle of elongated, parallel, straight tubes. Preferably the feed tube is also an elongated, straight tube, preferably parallel with the circulation tubes. While maintaining strength and physical integrity under the operating conditions of the reactor, the cooling tubes are preferably as thin as possible in order to facilitate efficient heat transfer and to minimise the overall weight of the cooling module 1. In order to maximise the reaction volume within a reactor the diameter of each circulation tube should be as small as possible, for example, from about 1 to about 10 cm, preferably from about 2 to about 5 cm.

The shape, size and configuration of the cooling modules and their arrangement within a reactor will be governed primarily by factors such as the capacity, operating conditions and cooling requirements of the reactor. The cooling module may have any cross section which provides for efficient packing of cooling modules within a reactor, for example, the cooling module may be of square, triangular, rectangular, trapezoidal (especially covering three equilateral triangles) or hexagonal cross section. A cooling module design that incorporates a square cross section is advantageous in terms of packing the modules within the reactor and in providing uniform cooling throughout the reactor volume. The cross sections of the cooling modules may be the same or different. Preferably they are the same. However, it might be advisable to use different shapes (and perhaps different number of cooling tubes) for the cooling modules alongside the reactor walls, in order to completely fill up all space in the reactor to improve cooling and to prevent spaces of low resistance for upflowing gas streams. The specific shape of the cooling module is obtained by designing and using cooling tubes which are bended in different shapes, and fixing these cooling tubes to the distribution and collection chamber. In this way the cooling tubes will have different distances to the central axis of the cooling module. The cross sectional area of the cooling module may typically be about 0.20 to 2.00 $m^2$ depending upon the number and configuration of cooling tubes employed and the cooling capacity required. Round or ellipsoidal shapes are less desired, as a multitude of such cooling modules do not fill up the total area of a cylindrical reactor. This may create bypasses for upgoing gas streams.

Figure 2:
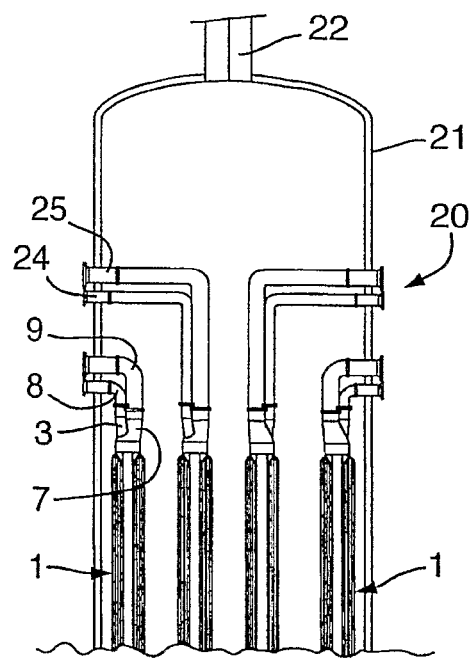
FIG. 2 illustrates a number of cooling modules in a reactor.
Figure 2:
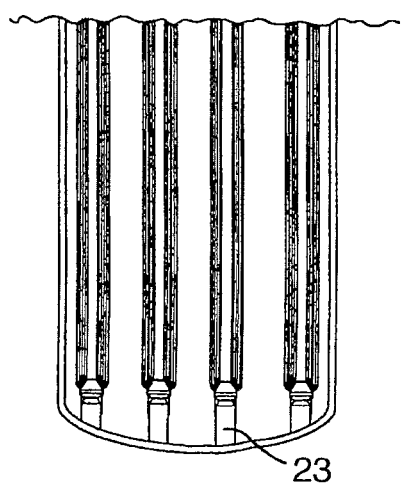

FIG. 2 illustrates one particular embodiment of another aspect of the invention, namely, a reactor 20 for carrying out an exothermic reaction. The reactor 20 comprises a reactor shell 21, reactant inlet means (not shown), product outlet means (not shown) and a cooling system comprising a plurality of cooling modules 1 as described above. Each cooling module 1 is removably held in place using suitable means. For example, supports 23 may be incorporated into the bottom of the reactor 20. Further means (not shown) may be provided at or towards the top of each cooling module 1 in order to ensure that they remain in the correct position within the reactor 20.

Access means, for example a manhole 22, provides access to the interior of the reactor 20 and specifically to cooling modules 1. The shape and size of the access means will be determined primarily be the dimensions of the internal components. Preferably a manhole having a diameter of between about 0.5 and about 3.0 m may be incorporated into the reactor shell 21, provided that this is compatible with the dimensions of the cooling modules 1 employed.

In known reactors cooling tubes are typically welded into place during manufacture. Given the size of commercial scale slurry reactors it is normally not possible to transport them in a vertical position. Transporting such a reactor horizontally places considerable strain on the cooling tubes inside the shell which can lead to the tubes being damaged during transportation. Thus the modular design of the cooling system of the invention represents a considerable advantage in that the cooling modules 1 and the reactor shell 21 may be manufactured and transported separately for assembly at the desired site. Furthermore the cooling modules 1 may be lowered into position in the reactor shell 21 without the need for any personnel to be inside at the bottom of the reactor. This eliminates the hazards associated with personnel having to operate within the reactor as is the case where cooling tubes have to be welded in place (for example, welded to a tube sheet or header located at the bottom of the reactor shell).

During construction, when a reactor is typically lying in a horizontal position, suitable means may be employed to support the cooling modules. For example one or more diaphragms or support grids may be positioned between the cooling modules or indeed between the circulation tubes 5 of each module 1. Such support means may optionally be left in place during operation of the reactor in order to maintain spacing between the elements in question and in particular to support the circulation tubes relative to each other.

Typically the charge pipe 8 and discharge pipe 9 are removably connectable to charge and discharge conduits 24, 25 which pass through the reactor shell 21 and may be connected to elements external of the reactor. The charge and discharge pipes 8, 9 may be connected to the charge and discharge conduits 24, 25 using 'c-clamps', as described above, or other suitable means.

Figure 3:
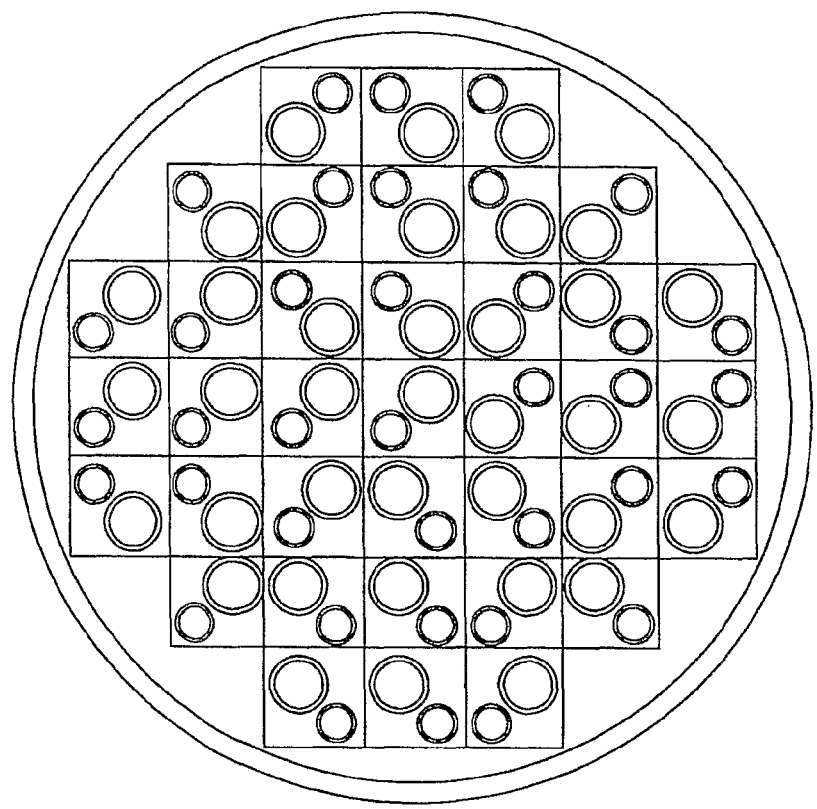
FIG. 3 is a plan view of a reactor housing a plurality of cooling modules.
Figure 4:
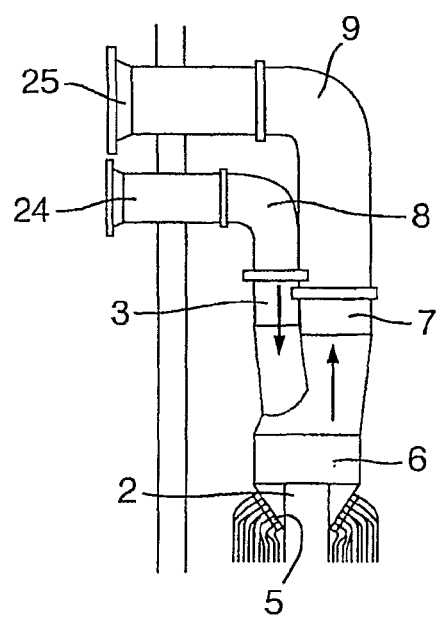
FIG. 4 is an elevation of the inlet/outlet piping arrangement at the top of a cooling module.

FIG. 4 illustrates, the removable connections between charge pipe 8 and inlet 3, discharge pipe 9 and outlet 7, charge pipe 8 and charge conduit 24, and discharge pipe 9 and discharge conduit 25 thus facilitating separate removal of each individual cooling module 1 from the reactor shell 21. FIGS. 2, 3 and 4 illustrate that once the connections referred to in the previous sentence have all been removed, the charge pipe 8 and discharge pipe 9 may be moved thus allowing for the cooling module 1 to be lifted vertically form its support 23. External lifting means (not shown) located above the reactor 20 may be attached, through the manhole 22 to a lifting fixture (not shown) on the cooling module 1.

With particular reference to FIG. 3 it will be appreciated that, once disconnected, the central-most cooling module may be lifted directly out of the reactor 20 via the manhole 22. The space vacated by the central-most module facilitates shuffling or movement of the remaining cooling modules 1 within the reactor shell 21. Internal lifting means (not shown) such as a hoist fixed in a space between the top of the cooling modules 1 and the ceiling of the reactor shell 21 may be provided to facilitate shuffling of the modules.

Figure 5:
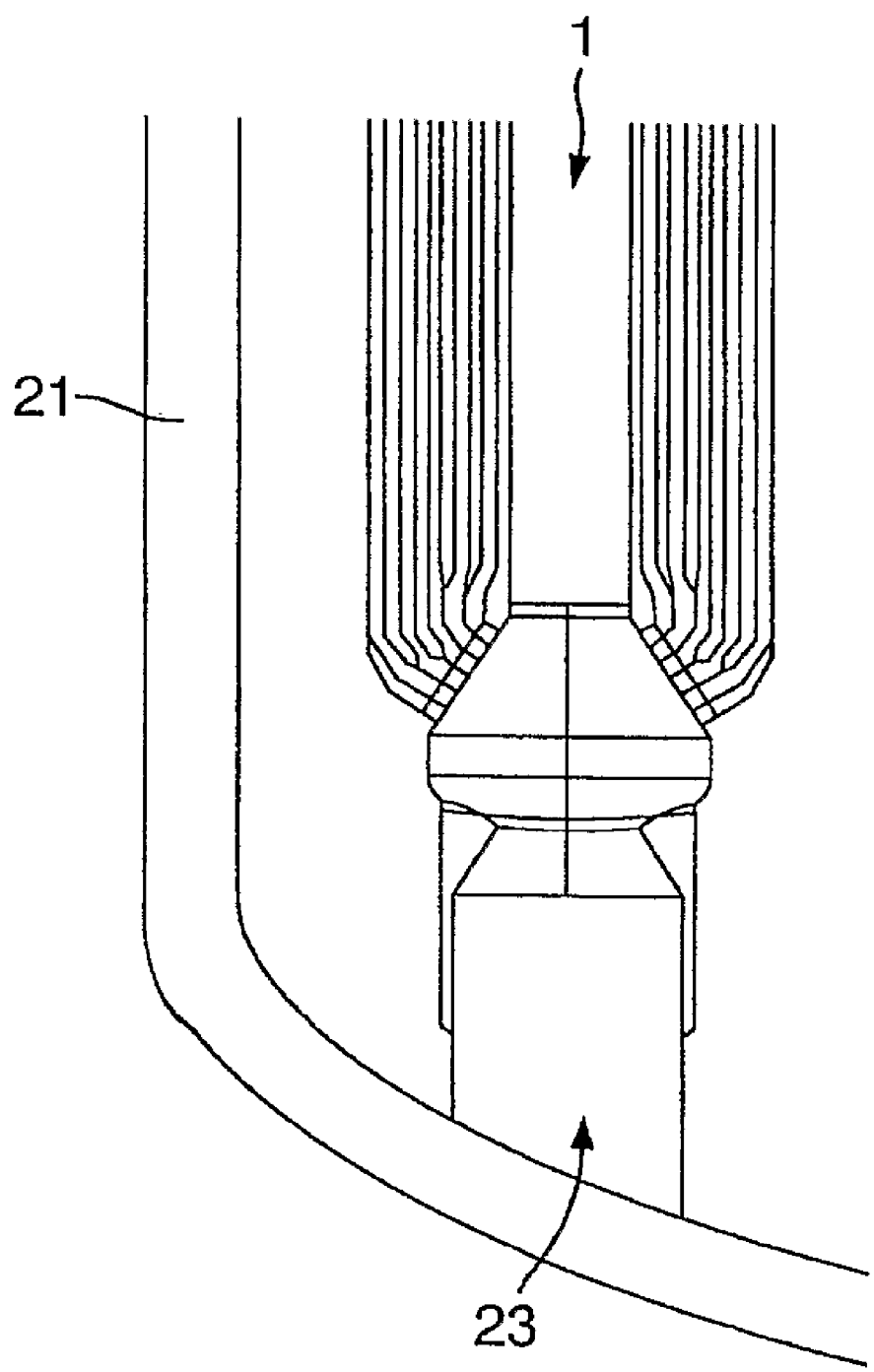
FIG. 5 illustrates the support of a cooling module at the base of a reactor.

FIG. 5 illustrates the arrangement at the bottom of a reactor shell 21 wherein supports 23 may be provided to bear the weight of each cooling module 1. The supports 23 further service to maintain the position of each cooling module 1 within the reactor 20. The end of a module 1 received by a support 23 is preferably adapted so that the cooling module 1 may be lowered into position from above without the need for any personnel to be present in the reactor. This represents an additional safety feature of the present invention.

As described above, synthesis gas leaking into the cooling system can be identified through analysis of the discharged coolant. In known reactors the repair of leaking cooling tubes can be difficult and in some cases not possible at all, in which case the leaking tube may have to be blocked off rather than repaired. Blocking off cooling tubes causes undesirable reductions in cooling capacity and can lead to unwanted hot spots or run away reaction in areas of the reaction mixture which are not properly cooled. In the case of a Fischer-Tropsch reaction it is preferred to carry out the Fischer-Tropsch reactor at a higher pressure than the steam pressure in the cooling modules. Preferably the difference is at least 1 bar, preferably at least 5 bar, more preferably at least 10 bar. In this way a leakage will always result in syngas/hydrocarbons leaking into the cooling module. By placing detectors in all separate outlets of all cooling modules, it can be fairly easily detected when a cooling module is leaking. Such a cooling module may be blocked, or the reactor can be stopped and the failing cooling module can be replaced.

The present invention provides a cooling unit that can be employed in modular system whereby individual cooling units 1 can be isolated and separately removed from the reactor 20 for inspection, replacement or repair purposes. This modular approach has the further advantage that repair of a leaking cooling module can be carried out outside of the reactor shell, thus eliminating the risks associated with the need for personnel to enter the reactor in order to effect repairs. The present invention facilitates straightforward and rapid repair of cooling modules, resulting in shorter down time than for that associated with repair of known reactors, with the advantage that lost production time can be minimised.

Typically the reactor may be used for carrying out three phase slurry reactions, such as for example Fisher Tropsch type reactions. The reactant inlet means may comprise one or more spargers located at the base of the reactor shell 21 and the product outlet means may comprise one or more filters. The person skilled in the art will be familiar with suitable sparger and filter systems employed in known three-phase slurry reactors.

The average particle size of the catalyst particles may very between wide limits, depending inter alia on the type of slurry zone regime. Typically, the average particle size may range from 1 μm to 2 mm, preferably from 1 μm to 1 mm.

If the average particle size is greater than 100 μm, and the particles are not kept in suspension by a mechanical device, the slurry zone regime is commonly referred to as ebullating bed regime. Preferably, the average particle size in an ebullating bed regime is less than 600 μm, more preferably in the range from 100 to 400 μm. It will be appreciated that in general the larger the particle size of a particle, the smaller the chance that the particle escapes from the slurry zone into the freeboard zone. Thus, if an ebullating bed regime is employed, primarily fines of catalyst particles will escape to the freeboard zone.

If the average particle size is at most 100 μm, and the particles are not kept in suspension by a mechanical device, the slurry zone regime is commonly referred to as a slurry phase regime. Preferably, the average particle size in a slurry phase regime is more than 5 μm, more preferably in the range from 10 to 75 μm.

If the particles are kept in suspension by a mechanical device, the slurry zone regime is commonly referred to as stirred tank regime. It will be appreciated that in principle any average particle size within the above ranges can be applied. Preferably, the average particle size is kept in the range from 1 to 200 μm.

The concentration of catalyst particles present in the slurry may range from 5 to 45% by volume, preferably, from 10 to 35% by volume. It may be desired to add in addition other particles to the slurry, as set out in for example European Patent Application Publication No. 0 450 859. The total concentration of solid particles in the slurry is typically not more than 50% by volume, preferably not more than 45% by volume.

Suitable slurry liquids are known to those skilled in the art. Typically, at least a part of the slurry liquid is a reaction product of the exothermic reaction. Preferably, the slurry liquid is substantially completely a reaction product.

The exothermic reaction is a reaction which is carried out in the presence of a solid catalyst, and which is capable of being carried out in a three-phase slurry reactor. Typically, at least one of the reactants of the exothermic reaction is gaseous. Examples of exothermic reactions include hydrogenation reactions, hydroformylation, alkanol synthesis, the preparation of aromatic urthanes using carbon monoxide, Kölbel-Engelhardt synthesis, polyolefin synthesis, and Fischer-Tropsch synthesis. According to a preferred embodiment of the present invention, the exothermic reaction is a Fischer-Tropsch synthesis reaction.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_5+$ hydrocarbons is at least 60% by weight of the total product, more preferably, at least 70% by weight, even more preferably, at least 80% by weight, most preferably at least 85% by weight. Reaction products which are liquid phase under reaction conditions may be separated and removed using suitable means, such as one or more filters. Internal or external filters, or a combination of both, may be employed. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, maganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and maganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and maganese and/or vanadium as promoter, the cobalt: (maganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ration is in the range from 1.0 to 2.5.

The gaseous hourly space velocity may very within wide ranges and is typically in the range from 1500 to 10000 Nl/l/h, preferably in the range from 2500 to 7500 Nl/l/h.

The Fischer-Tropsch synthesis is preferably carried out in a slurry phase regime or an ebullating bed regime, wherein the catalyst particles are kept in suspension by an upward superficial gas and/or liquid velocity.

It will be understood that the skilled person is capable to select the most appropriate conditions for a specific reactor configuration and reaction regime.

Preferably, the superficial gas velocity of the synthesis gas is in the range from 0.5 to 50 cm/sec, more preferably in the range from 5 to 35 cm/sec.

Typically, the superficial liquid velocity is kept in the range from 0.001 to 4.00 cm/sec, including liquid production. It will be appreciated that he preferred range may depend on the preferred mode of operation.

According to one preferred embodiment, the superficial liquid velocity is kept in the range from 0.005 to 1.0 cm/sec.

The invention also relates to the preparation of hydrocarbon compounds by reaction of carbon monoxide and hydrogen in the presence of an iron or cobalt catalyst, preferably a cobalt catalyst, the catalyst preferably comprising a refractory oxide carrier, at elevated temperature and pressure, in which process a three phase slurry reactor is used which reactor is provided with one or more cooling modules according to the present invention and described in this specification above.

The invention also concerns the hydrocarbons as made in the process described above. In addition, the invention relates to hydrocarbons made by hydroprocessing, especially hydrogenation, hydroisomerisation and/or hydrocracking, the hydrocarbon compounds obtained in the catalytic hydrogenation of carbon monoxide as described above. More specifically the hydrocarbons mode comprise n-paraffins (solvents, detergent feedstocks, drilling fluids etc.), naphtha, kerosene, gasoil, waxy raffinate and base oil.

We claim:

1. A method for carrying out an exothermic reaction comprising the steps of: charging a reactor with reactants; cooling the contents of the reactor and removing products from the reactor, wherein cooling is carried out using at least one cooling module comprising a coolant feed tube; a distribution chamber; a plurality of circulation tubes; and a collection chamber; said coolant feed tube having at its first end an inlet, for charging the cooling module with coolant, and communicating with said distribution chamber at its second end; each of said circulation tubes communicating with the distribution chamber through a first end and communicating with said collection chamber through a second end; the collection chamber having an outlet for discharging coolant; wherein the inlet and the outlet are both located towards the same end of the cooling module, wherein the inlet is adapted to be removably connectable to a charge pipe and the outlet is adapted to be removably connectable to a discharge pipe such that they can be disconnected without the use of a cutting means.

2. A process according to claim 1 for the synthesis of hydrocarbons wherein the reactor is charged with syngas.

* * * * *